358-84. OR 3,255,306 SR

SEARCH ROOM

INVENTORS.
JOHN O. CAMPBELL,
YEE T. LIU,
BY Harold L Jackson
ATTORNEY.

CLOSED-CIRCUIT TELEVISION NETWORK

INVENTORS.
JOHN O. CAMPBELL,
YEE J. LIU,
BY Harold L. Jackson
ATTORNEY.

3,255,306

CLOSED-CIRCUIT TELEVISION NETWORK

John O. Campbell, 1004 Selby Ave., Los Angeles, Calif., and Yee J. Liu, Los Angeles, Calif. (15801 Hart St., Van Nuys, Calif.)

Filed June 4, 1958, Ser. No. 739,737
10 Claims. (Cl. 178—6)

The present invention relates generally to closed-circuit television networks and more particularly to a billing system for such networks.

Various types of billing systems for pay television have heretofore been proposed. One proposed system employs the use of telephone equipment, another employs a punch card to be mailed in by each subscriber, and another uses a coin box secured to each receiver in the closed-circuit network. All of the proposed systems have disadvantages. For example, the use of telephone equipment for pay television billing purposes would undoubtedly require expensive modification of most existing telephone equipment. The use of punch cards and coin boxes would be troublesome to most subscribers and would result in a high cost billing operation.

The foregoing disadvantages are overcome by the billing system of the present invention.

A closed-circuit television (TV) network includes a source of television signals, a plurality of television receivers and a transmission line coupling the receivers to the source of TV signals.

In accordance with the present invention there is provided a billing system for a closed-circuit TV network in which a program selector means is coupled individually between each of the receivers and the source of TV signals. Each of the program selector means includes means for selectively connecting the respective receiver to the source of TV signals and means for generating a subscriber identification signal representative of the particular selector means and for impressing the identification signal on the transmission line. Means, which may be located at a central office, is coupled to the transmission line for recording the identification signals and for analyzing the recorded signals for billing purposes. The present billing system does not burden the subscriber with punch cards, coin boxes, etc. and requires no additional transmission lines. When a pay program is selected by each individual subscriber, billing information is transmitted over the same transmission network that carries the TV program signals to the central office where a record is made and bills are prepared for mailing.

Figure 1:
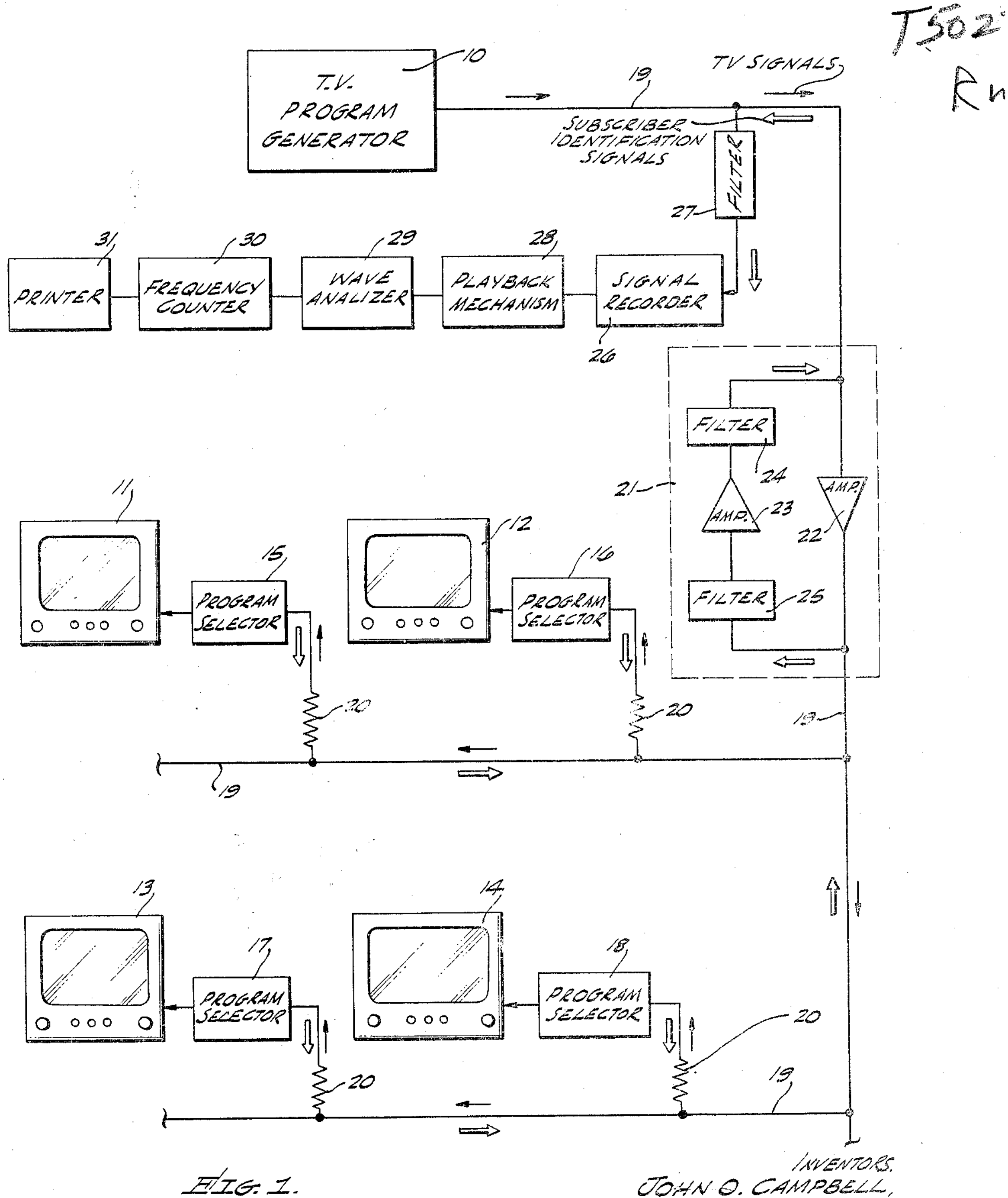
Figure 2:
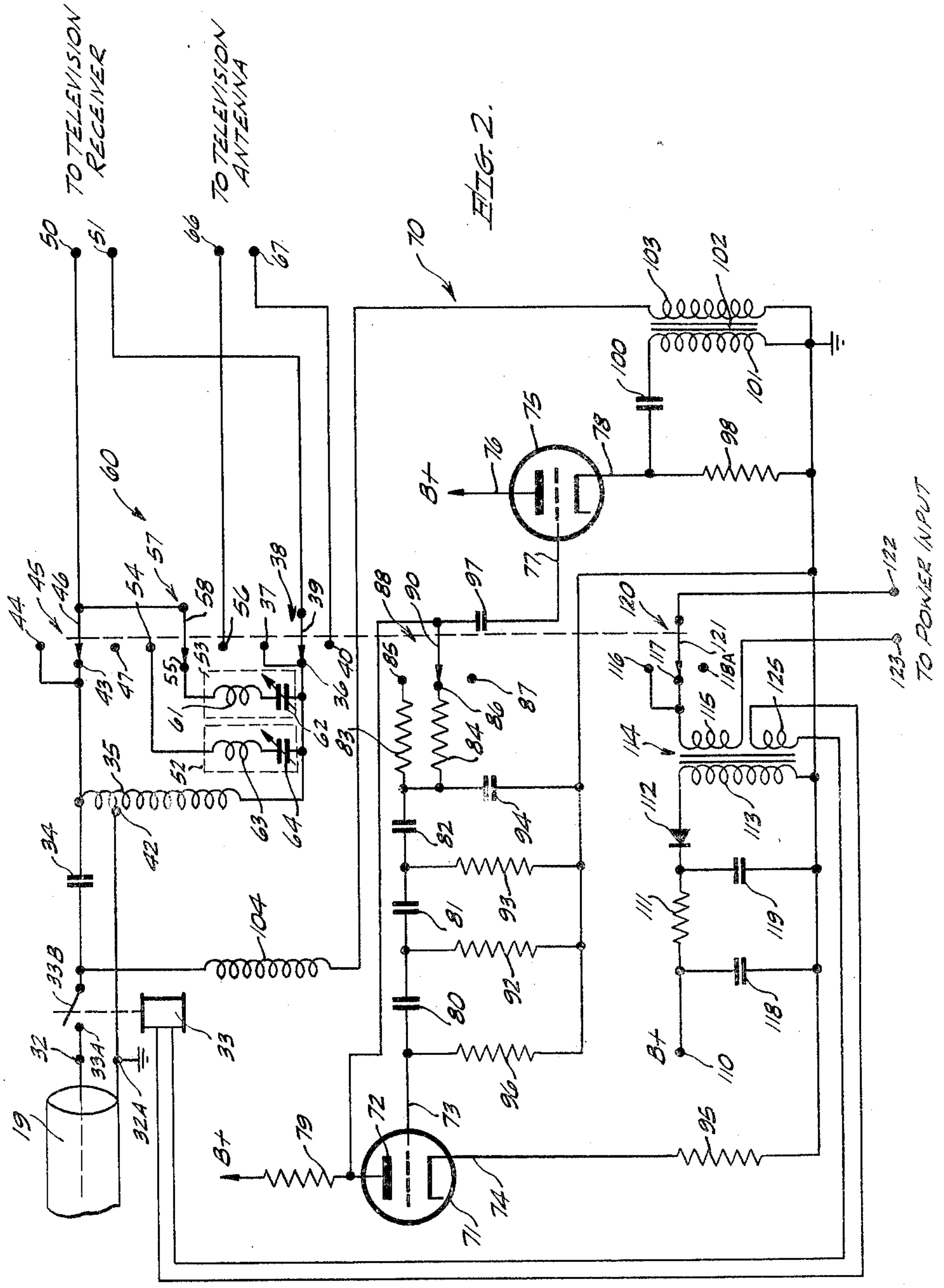

The invention is described in more detail in reference to the accompanying drawings, in which:

FIG. 1 is a block diagram of a billing system embodying the principles of the present invention, and FIG. 2 is a schematic circuit diagram of a program selector that may be utilized in the circuit of FIG. 1.

Referring now to the drawing, and more particularly to FIG. 1 thereof, a television program generator 10 is arranged to generate simultaneously a plurality of television program signals for a closed circuit television network. The network shown includes four television receivers designated for four individual subscribers by the reference numerals 11–14. A program selector is connected to each of the receivers for selectively coupling any one of the program signals from the generator 10 to the respective receiver as will be more fully described hereinafter. As shown, program selectors 15–18 are connected to the receivers 11–14 respectively. The TV program signals from the generator 10 are fed to each of the program selectors 15–18 by means of a suitable transmission line 19 which may for example be a coaxial cable. Coupling resistors 20 are connected between the transmission line 19 and the program selectors 15–18 as shown in FIG. 1 to reduce the TV program signal levels to the proper values for feeding into the TV receiver and also to prevent appreciable loading of the line 19 by the individual television receivers that are coupled thereto. The coupling resistors 20 may be of the non-inductive type and should have impedance values that are large compared with the impedance of the transmission line 19.

Each of the program selectors includes means for generating a subscriber-program identification signal having a frequency that is indicative of the particular selector and of the particular TV program signal that is being coupled to the receiver associated with the selector. The frequencies of the subscriber-program identification signals may conveniently be considerably lower than the TV signal frequencies or they may be any convenient frequency different from the TV signal frequencies. The subscriber-program identification signals are applied to the transmission line 19 that couples the TV program signals from the generator 10 to each of the selectors. Thus signals representative of a particular selector and of a particular television program being coupled to the receiver connected to the selector are fed back down the transmission line towards the program generator 10. When the frequencies of the subscriber-program identification signals are higher than the TV signal frequencies the coupling resistors 20 may be replaced with suitable capacitors for coupling TV program signals into the individual TV receivers and for coupling the identification signals from the program selector to the transmission line 19. The use of resistors for coupling impedances is only necessary where the frequencies of the identification signals are much lower than the TV signal frequencies to prevent high attenuation of the identification signals.

In a distribution system of any practical size, booster stations, such as that indicated generally at 21, should be provided along the transmission line 19 for amplifying the television signals and also for amplifying the subscriber identification signals generated by the program selectors. The booster station 21 includes a TV program signal amplifier 22 which is inserted in the television transmission line 19 for amplifying the TV signals to maintain a suitable TV signal level along the transmission line. The booster station 21 also includes an identification signal amplifier 23 which is arranged to amplify the subscriber identification signals generated by the program selectors. A pair of suitable filter networks 24 and 25 are connected between the transmission line and each side of the amplifier 23 to reject or present a high impedance to the TV program signals and to pass or present an impedance match to the subscriber-program identification signals. The filters 24 and 25 may be low pass, high pass or band pass filters depending on whether the frequencies of the subscriber-program identification signals are lower, higher or in between the frequencies of the TV program signals. It is not essential that each booster station be provided with an identification signal amplifier, it is only necessary that some means such as the filters 24 and 25 be provided for bypassing the subscriber-program identification signals around the TV signal amplifier 22 so that the identification signals may be transmitted back down the transmission line to the means for recording and analyzing the identification signals.

A recorder 26 which may be a suitable magnetic tape recorder is connected to the transmission line 19 at some central location which is referred to as the central office through another suitable filter 27. The filter 27 prevents the TV program signals from being translated to the recorder 26. The recorder 26 may conveniently be operated periodically to record the subscriber identification signals that are being generated by the program selectors. For example, the recorder 26 may be operated for a short time interval, say one minute, every 10 or 15 minutes during the time that TV program signals are being transmitted in the network so that the time duration that each individual subscriber is receiving one of the TV program signals or that each selector is generating a subscriber-program identification signal can be approximately determined.

A suitable payback mechanism 28 is coupled to the recorder 26 for playing back at a convenient time the signals recorded in the recorder. A wave analyzer 29 is connected to the playback mechanism 28 for identifying the signals recorded by the recorder 26 during each recording interval. Such wave analyzers are well known in the art and are capable of discriminating alternating current signals having a difference in frequency of a very few cycles. If desired the subscriber-program identification signals may be fed directly to the wave analyzer 29 and the recorder 26 and the playback mechanism 28 may be omitted. A suitable frequency counter 30 is connected to the wave analyzer 29 to obtain a count indicative of the frequency of each present subscriber-program identification signal. A suitable read-out mechanism such as printer 31 is coupled to the frequency counter 30 for making a permanent record of the numbers which identify the subscriber-program identification signals that were present during each of the sampling intervals. The read-out mechanism may suitably record the output data from the counter for example in the form of printed or punched cards or tape.

Referring now to FIG. 2, there is shown a schematic circuit diagram of one type of program selector that may be utilized in the circuit of FIG. 1 for selectively coupling first and second TV program signals to a recever and for generating two separate low frequency subscriber-program identification signals. The selector of FIG. 2 includes a pair of input terminals 32 and 32A that are connected to the incoming transmission line 19 which is illustrated as a co-axial cable. The terminal 32A is connected to ground and the terminal 32 is connected to a fixed contact 33A of a relay 33 which includes movable contact 33B. An isolation capacitor 34 is connected between the movable contact 33B and one terminal of an impedance transformer 35, the other terminal of which is connected to fixed contacts 36 and 37 of a switch 38. The switch 38 also includes a movable contact 39 and another fixed contact 40. The input terminal 32A is connected to an intermediate tap 42 of the impedance matching transformer 35 and the transformer 35 is connected to two fixed contacts 43 and 44 of a switch 45. The switch 45 also includes a movable contact 46 and another fixed contact 47. The movable contacts 39 and 46 of the switches 38 and 45 respectively are connected to a pair of output terminals 50 and 51 which are adapted to be connected to the input circuit (antenna input) of a television receiver for coupling one of the television program signals transmitted over the line 19 to the receiver as will be more fully described.

A pair of series resonant L–C circuits 52 and 53 are connected at one end to the fixed contacts 54 and 55 respectively of a switch 57. The switch 57 also includes a fixed contact 56 and a movable contact 58. The other ends of the series resonant circuits 52 and 53 are connected to the fixed contact 36. The resonant circuit 53 includes a series connected inductor 61 and a variable capacitor 62 and the resonant circuit 52 includes a series connected inductor 63 and a variable capacitor 64. The series resonant circuits 52 and 53 are arranged to resonate at two separate frequencies which are equal to the carrier frequencies of the two television program signals being transmitted over the line 19. The switches 38, 45, and 57 are ganged and form a part of a selector switch indicated generally at 60. When the movable contacts 39, 58 and 46 engage the contacts 36, 55 and 43 respectively, the transmission line 19 will be coupled to the output terminals 50 and 51 with the series resonant circuit 53 connected across these output terminals. The series resonant circuit 53 is arranged to resonate at the carrier frequency for the first TV program signals and will appear as a very low impedance or a short circuit to the first TV program signals and thus permit only the second TV program signals to appear across the output terminals 50 and 51. When the selector switch 60 is operated so that the movable contact 58 engages the fixed contact 54, the resonant circuit 52 will be connected between the output terminals 50 and 51. In this arrangement the first TV program signal will be transmitted to the receiver and the second TV program signal will be attenuated by the short circuit path of the resonant circuit 52. In this manner the program selector of FIG. 2 is arranged to selectively couple one and only one of the TV program signals at a time to the television receiver. While only two series resonant circuits 52 and 53 are disclosed for permitting the selector to select one or two program signals it is to be understood that any number of such series resonant circuits may be utilized in the circuit of FIG. 2 with an appropriate gang selector switch to permit one of many TV program signals to be coupled to the television receiver.

To permit the television receiver to be connected to an external antenna for receiving free television signals that are being transmitted over the air, a pair of antenna terminals 66 and 67 are connected to the fixed terminals 56 and 40 respectively of the switches 57 and 38. When the selector switch 60 is positioned so that the movable contacts 58 and 39 engage the contact 56 and 40, an external antenna is connected to the television receiver and the transmission line 19 is disconnected from the receiver. Thus a subscriber may conveniently operate the program selector to connect his television receiver to any one of the TV program signals being transmitted over the line 19 or to an outside antenna for receiving free television program signals.

The program selector in the circuit of FIG. 2 also includes a subscriber-program identification signal generator indicated generally at 70. This signal generator includes a pair of diodes 71 and 75. The triode 71 includes a plate 72, a grid 73 and a cathode 74. The triode 71 is energized from a source of positive potential indicated as B+, through a plate resistor 79. The triode 71 is connected as a resistance-capacitance (R-C) oscillator for generating an alternating current signal having a frequency that is determined by the time constant of the R-C network connected between its grid and plate. As is shown, three capacitors 80–82 are connected in series between the grid 73 and the junction of a pair of frequency determining resistors 83 and 84. The resistors 83 and 84 are connected to two fixed contacts 85 and 86 respectively of a switch 88 which includes a movable contact 90 and another fixed contact 87. The switch 88 is ganged to the switches 38, 57 and 45 and is a part of the selector switch 60 so that when the first television program signal is selected the resistor 83 is connected in the feedback circuit of the oscillator or between capacitor 82 and the plate 72 and when the second TV program signal is selected the resistor 84 is connected in the feedback circuit of the oscillator 71. The resistors 83 and 84 have different values so that when the resistor 83 is connected in the oscillator feedback circuit, the oscillator 71 will generate one frequency and when the resistor 84 is connected in the feedback circuit the oscillator 71 will generate another frequency. The R-C feedback network of the oscillator 71 includes resistors 92, 93 and 96 and a capacitor 94. A cathode bias resistor 95 is connected in series between the cathode 74 and ground.

The triode 75 is connected as a cathode follower with the grid 77 thereof being connected to the plate 72 of triode 71 through a coupling capacitor 97. The plate 76 is coupled to the source of a positive potential B+. The cathode 78 of the triode 75 is connected to ground through a suitable resistor 98. A capacitor 100 couples the output of the cathode follower to a primary winding 101 of a coupling transformer 102. The transformer 102 includes a secondary winding 103 which is connected through an isolation choke 104 to the movable contact 33B of the relay 33. Thus the signals generated by the oscillator 71, which are representative of the particular selector and of a particular TV program selected, are fed to the cathode follower 75 and connected by means of the coupling condenser 100, transformer 102, isolation choke 104 and contacts 33A, 33B to the transmission line 19 when one of the TV program signals is being coupled to the receiver. The isolation choke 104 provides a very high impedance to the high frequency TV program signals and thus isolates such signals from the signal generator 70.

To control the operation of the signal generator 70 so that the generator will be rendered operative only when a TV program signal from the line 19 is being coupled to the receiver, the triodes 71 and 75 are energized only when the selector switch 60 is actuated to connect the line 19 to the output terminals 50 and 51 as will be described. Plate resistor 79 and plate 76 of the triodes 71 and 75 are connected to B+ terminal 110. The terminal 110 is connected through a suitable resistor 111 and a half wave rectifier 112 to a primary winding 113 of a power transformer 114. A pair of filter capacitors 118 and 119 are connected between ground and the respective ends of the resistor 111. The power transformer 114 includes a primary winding 115, one terminal of which is connected to fixed contacts 116 and 117 of a switch 120. The switch 120 is ganged with the switches 88, 38, 57 and 45 as shown and includes a movable contact 121 and another fixed contact 118A. The other terminal of the primary winding 115 and the movable contact 121 of the switch 120 are connected to a pair of power input terminals 122 and 123 which are adapted to be connected to a suitable source of alternating current energizing potential such as 115-volt, 60-cycle line voltage. Thus power is supplied to the triodes 71 and 75 only when the selector switch is arranged to couple one of the pay TV program signals from the line 19 to the receiver.

The power transformer 114 also includes a secondary winding 125 which is connected to the relay 33 to energize the relay 33 and cause it to close its contacts 33A and 33B when switch 60 is positioned to select a pay TV program. In this manner the contacts 33A, 33B of the relay 33 are open and prevent the pay TV program signals from being coupled to the receiver unless the transformer 114 is energized by an electric power source at terminals 122 and 123 so that subscriber identification signals may be generated by the program selector and transmitted down the transmission line 19 to the central station for recording and billing purposes.

While the program selector illustrated in FIG. 2 employs a selector switch 60, a plurality of series resonant circuits 52, 53 and an R-C variable frequency oscillator 70 to selectively couple one of a plurality of TV program signals to a receiver and generate a subscriber-program identification signal, it is to be understood that other types of circuits well known in the art could be utilized to perform these functions. It is only necessary that the program selector include means for selectively coupling one or more TV program signals to the receiver connected thereto and selectively generate one or more identification signals which preferably have a frequency representation of the particular selector and the TV program being coupled to the receiver.

The particular selection of subscriber-program identification signal frequencies will of course depend upon the number of subscribers, number of pay TV program channels available and the resolution capabilities of the frequency analyzer. Since the frequency of any practical oscillator is subject to drift the frequency difference between any two identification signals must be sufficient to allow for the expected drift of the oscillator in the program selectors and still permit reliable identification of the individual identification signals by the frequency analyzer. The proper selection of the subscriber-program identification signal frequencies may be made from the following formula:

$$f_N=f_1\left(\frac{1+x}{1-X}\right)^{N-1}+\frac{(N-1)\beta}{1-X}$$

where $N$=The number of separate signal frequencies available in a band of frequencies between $f_1$ and $f_N$ to identify each subscriber and each TV program signal.

$X$=The fractional drift in the subscriber-program identification frequency oscillator or $\Delta f/f$.

$\beta$=The frequency separation necessary between any two signal frequencies to permit reliable resolution by the analyzer or the half-bandwidth of the analyzer filter at the proper rejection level.

$f_N$=The frequency of the Nth subscriber-program identification signal.

$f_1$=The frequency of the 1st subscriber-program identification signal where $f_1<f_N$.

There has been thus disclosed a billing system for a closed-circuit pay TV system which is reliable, efficient and relatively inexpensive to manufacture, install and operate. It is, of course, apparent that the disclosed billing system may also serve the useful purpose of audience rating for TV programs. This automatically follows since audience rating involves the determining of the number of TV receivers tuned to each TV program.

What is claimed is:

1. In a closed-circuit television network, the combination which comprises a source of a plurality of television program signals, a plurality of television receivers, a program selector connected individually to each of the receivers, conducting means interconnecting each of the selectors to the source, each of the selectors being arranged to selectively couple any one of the plurality of television program signals to the receiver connected to the selectors, each of the selectors being further arranged to generate an identification signal having a frequency that is indicative of the particular selector and of the particular television program that is being coupled to the receiver connected to the selector, means for coupling the identification signals generated by each of the selectors to the conducting means interconnecting the selectors to the source of television signals and means coupled to the conducting means for receiving the identification signals generated by the selectors and for recording the time duration of each identification signal.

2. In a billing system for a closed-circuit television network having a source of at least first and second television program signals and at least first and second television receivers and an electric transmission line coupled to the source, the transmission line carrying all of the television program signals, the combination which comprises first and second program selectors connected between the transmission line and the first and second receivers respectively, each of the selectors including means for selectively coupling each of the television program signals to the receiver connected to the selector, the first selector including means for applying identification signals having first and second frequencies respectively to the transmission line when the first and second television program signals are being coupled to the first receiver, the second program selector including means for applying identification signals having third and fourth frequencies respectively to the transmission line when the first and second television program signals respectively are being coupled to the second receiver and means connected to the transmission line for receiving and analyzing each of the identification signals.

3. In a system for billing subscribers or rating the audience of a closed-circuit television network which includes a source of a plurality of television program signals, a plurality of television receivers and a transmission line for interconnecting each of the receivers to the source, the transmission line carrying all of the television program signals, the combination which comprises a program selector coupled individually between each of the receivers and the transmission line, each of the program selectors including a selector switch for selectively coupling any one of the television program signals to the respective receiver, each of the program selectors further including an oscillator under the control of the selector switch for generating an alternating current identification signal having a frequency indicative of the particular program selector and of the particular television program signal being coupled to the receiver connected to the particular program selector, means for coupling each of the identification signals to the transmission line, and means for receiving and analyzing the identification signals generated by the oscillators of the program selectors.

4. In a system for billing subscribers and rating the audience of a closed-circuit television network which includes a source of a plurality of television program signals, a plurality of television receivers and a transmission line for interconnecting each of the receivers to the source, the transmission line carrying all of the television program signals, the combination which comprises a program selector coupled individually between each of the receivers and the transmission line, each of the program selectors being arranged to selectively couple any one of the television program signals to the respective receiver and to generate coded signals indicative of the particular selector and of the television program being coupled to the respective receiver, each of the program selectors being further arranged to apply the coded signals to the transmission line, and means connected to the transmission line for receiving and identifying the coded signals generated by each of the program selectors.

5. The combination as defined in claim 4 wherein each of the coded signals is an alternating current signal having a frequency representative of a particular receiver and a particular television program signal.

6. The combination as defined in claim 5 wherein the means for identifying the coded signals includes a wave analyzer for selectively identifying each individual frequency-coded signal, counting means connected to the wave analyzer for counting the frequencies representative of the individual frequency-coded signals generated by the program selectors, and read-out means connected to the counting means for recording data representative of the output from the counting means.

7. In a closed-circuit television network having a source of television program signals and at least first, second and third television receivers, the combination which comprises a transmission line for interconnecting each of the receivers to the source, the transmission line carrying all of the television program signals, first, second and third program selectors connected between the transmission line and the first, second and third receivers, respectively, each of the selectors including means for selectively coupling the television program signals to the receiver connected thereto and for generating an identification signal having a frequency that is representative of the particular selector in response to television signals being coupled to the respective receiver, each of the selectors being further arranged to simultaneously generate said identification signals in response to the television signals being coupled to the first, second and third receivers and means for simultaneously receiving the identification signals generated by each of the selectors.

8. In a closed-circuit programmed television service distribution system, the combination of: a transmission line; means for delivering to said transmission line a plurality of television program signals; at least one television receiver; a program selector coupled between said television receiver and said transmission line, the selector comprising first means for selectively coupling any one of the television programs to said receiver, said selector further comprising second means for generating and applying to the transmission line signal intelligence which identifies the selector and the program; and means coupled to the transmission line for receiving said signal intelligence and recording its time duration.

9. In a closed-circuit programmed television service distribution system, the combination of: a transmission line; means for delivering to said transmission line a plurality of television program signals; at least one television receiver; a program selector coupled between said television receiver and said transmission line, the selector comprising first means for selectively coupling any one of the television programs to said receiver, said selector further comprising second means for generating and applying to the transmission line signal intelligence which identifies the selector and the program; means coupled to the transmission line for receiving said signal intelligence and recording its time duration; means for interlocking said first means and said second means of said selector; a power supply, said second means of said selector containing elements energized by said power supply; and means controlled by the first means of said selector to couple said second means of said selector to said power supply when a program selection is made.

10. In a closed-circuit programmed television service distribution system, the combination of: a transmission line; means for delivering to said transmission line a plurality of television program signals; at least one television receiver; a program selector coupled between said television receiver and said transmission line, the selector comprising first means for selectively coupling any one of the television programs to said receiver, said selector further comprising second means for generating and applying to the transmission line signal intelligence which identifies the selector and the program; means coupled to the transmission line for receiving said signal intelligence and recording its time duration; and means for interlocking said first means and said second means of said selector.

References Cited by the Examiner

UNITED STATES PATENTS

| | | | |
|---|---|---|---|
| 2,031,075 | 2/1936 | Scheibell | 178—6 |
| 2,513,112 | 6/1950 | Shepherd | 179—7 |
| 2,630,365 | 3/1953 | Rahmel | 346—33 |
| 2,674,512 | 4/1954 | Bogert | 235—52 |
| 2,839,173 | 6/1958 | Loew | 346—33 |
| 2,854,506 | 9/1958 | Pickles | 178—5.1 |
| 2,978,676 | 4/1961 | Spencer | 325—53 |
| 2,996,580 | 8/1961 | Reid | 235—52 |
| 3,034,707 | 5/1962 | Jefferson | 235—52 |
| 3,048,822 | 8/1962 | Wendt | 178—5.1 |
| 3,058,065 | 10/1962 | Freeman | 325—31 |

DAVID G. REDINBAUGH, *Primary Examiner.*

NEWTON N. LOVEWELL, ELI J. SAX, STEPHEN W. CAPELLI, *Examiners.*

R. M. HESSIN, H. W. BRITTON, *Assistant Examiners.*